United States Patent [19]

Ajanovic et al.

[11] Patent Number: 5,761,444

[45] Date of Patent: Jun. 2, 1998

[54] METHOD AND APPARATUS FOR DYNAMICALLY DEFERRING TRANSACTIONS

[75] Inventors: Jasmin Ajanovic, Folsom; Robert N. Murdoch, Sacramento; Timothy M. Dobbins, Folsom; Aditya Sreenivas, Folsom; Stuart E. Sailer, Folsom; Jeffrey L. Rabe, Rancho Cordova, all of Calif.

[73] Assignee: Intel Corporation, Santa Clara, Calif.

[21] Appl. No.: 523,385

[22] Filed: Sep. 5, 1995

[51] Int. Cl.$^6$ .................................................. G06F 13/36
[52] U.S. Cl. .......................... 395/280; 395/287; 395/293; 395/292; 364/149; 364/172
[58] Field of Search .................................. 395/280, 287, 395/293, 292, 309, 306, 468, 297, 325; 364/149, 172

[56] References Cited

U.S. PATENT DOCUMENTS

| 3,641,505 | 2/1972 | Artz et al. | 340/172.5 |
|---|---|---|---|
| 4,148,012 | 4/1979 | Baump et al. | 340/149 |
| 4,991,008 | 2/1991 | Nama | 358/108 |
| 5,426,740 | 6/1995 | Bennett | 395/325 |
| 5,524,216 | 6/1996 | Chan et al. | 395/287 |
| 5,535,340 | 7/1996 | Bell et al. | 395/292 |
| 5,546,546 | 8/1996 | Bell et al. | 395/292 |

*Primary Examiner*—Ayaz R. Sheikh
*Assistant Examiner*—Eric Thlang
*Attorney, Agent, or Firm*—Blakely, Sokoloff, Taylor & Zafman

[57] ABSTRACT

A method and apparatus for regulating the deferral of a transaction issued on a bus by a processor in a computer system is disclosed. A bus transaction recorder coupled to the bus processes encoded signals from the transaction issued on the bus. A line coupled to the bus sends an indication signal when a pending transaction request is issued on the bus. A CPU latency timer times the current transaction on the bus when a new pending transaction is waiting on the bus. The CPU latency timer outputs an expiration signal when the transaction takes more than a predetermined amount of time to complete. A transaction processor unit is coupled to the bus transaction recorder, the line, and the CPU latency timer. The transaction processor unit defers the transactions issued on the bus when the transaction processor receives the indication signal indicating that a pending transaction is waiting to be issued on the bus, when the encoded signals from the transaction issued on the bus indicate that the transaction issued on the bus is a candidate for deferral, and when the CPU latency timer outputs the expiration signal.

10 Claims, 9 Drawing Sheets

METHOD AND APPARATUS FOR DYNAMICALLY DEFERRING TRANSACTIONS

FIELD OF THE INVENTION

The present invention relates to a device for reducing latency on a CPU bus. More specifically, the present invention relates to an apparatus and method for regulating split or deferred transactions in a computer system.

BACKGROUND OF THE INVENTION

Buses are traditionally classified as CPU buses or I/O buses. Processor buses are short, generally high speed, and matched to the memory system so as to maximize memory-processor bandwidth. I/O buses, by contrast, can be lengthy, can have many types of devices connected to them, and often have a wide range in the data bandwidth of the devices connected to them. I/O buses may interface with memory through a I/O bridge memory controller or use the CPU bus to connect to memory.

A typical transaction on a CPU bus may be broken down into several phases. An agent on the bus, either a processor or the I/O interface, initiates a transaction by making request for the bus. During an arbitration phase, bus agents arbitrate amongst themselves to determine the next owner of the bus. Once an agent has won arbitration during the arbitration phase, it places a request on the bus in a request phase. During an error phase of the transaction, all agents check the request for correct parity and can signal a possible error. All processors check the address of the request of the transactions against the contents of their caches and indicate the results during a snoop phase of the transaction. The snoop phase marks the point in the transaction where the ownership of the cache data and the global observation point of the processor's memory access is determined. The transaction then completes with a response phase where further information regarding the completion of the transaction can be signaled. Based on the type of transaction a request-initiated, response-initiated or snoop-initiated data phase can be present in the transaction.

Although multiple transactions may be issued on the CPU bus at one time, only one transaction may be in each of the phases at the same time. When a transaction occupies any one of the phases for a long period of time it will postpone subsequent transactions from running on the CPU bus. Computer systems having multiple processors or a single processor pipelined to issue consecutive transactions experience delay when a processor transaction involving data transfers to external buses are executed. For example, processor I/O access transactions normally take several clock periods to complete. I/O access transactions include accesses to I/O devices such as data storage devices or memory on the I/O bus such as flash memory. During the period of time signals are propagated to the I/O device or data is retrieved from the I/O device, the processor continues to hold the data bus lines. This prevents other transactions from using the data bus lines and generates latency problems.

Thus, what is needed is a method and apparatus for reducing latency caused by bottle necking in the CPU bus by processor I/O access transactions.

SUMMARY OF THE INVENTION

A transaction deferral mechanism for regulating deferral of a transaction issued on a bus by a processor is disclosed. A bus transaction recorder is coupled to the bus for processing encoded signals from the transaction issued on the bus. A transaction processor unit is coupled to the bus transaction recorder and the bus. The transaction processor unit defers the transaction issued on the bus when the transaction processor unit receives an indication signal from the bus indicating that a pending transaction is waiting to be issued on the bus and when the encoded signals from the transaction issued on the bus indicates that the transaction issued on the bus is a candidate for deferral.

A method for regulating deferral of a current transaction is disclosed. First, determine whether a pending transaction exists. Next, determine whether the current transaction is deferrable. Lastly, defer the current transaction if the pending transaction exists and the current transaction is deferrable.

BRIEF DESCRIPTION OF THE DRAWINGS

The present invention will be understood more fully from the detailed description given below and the accompanied drawings of the various features and elements embodied in the invention. The description and drawings are not meant to limit the invention to the specific embodiment. They are provided for explanation and understanding.

DETAILED DESCRIPTION

A novel transaction deferral unit is disclosed. In the following detailed description, numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure the present invention.

Figure 1:
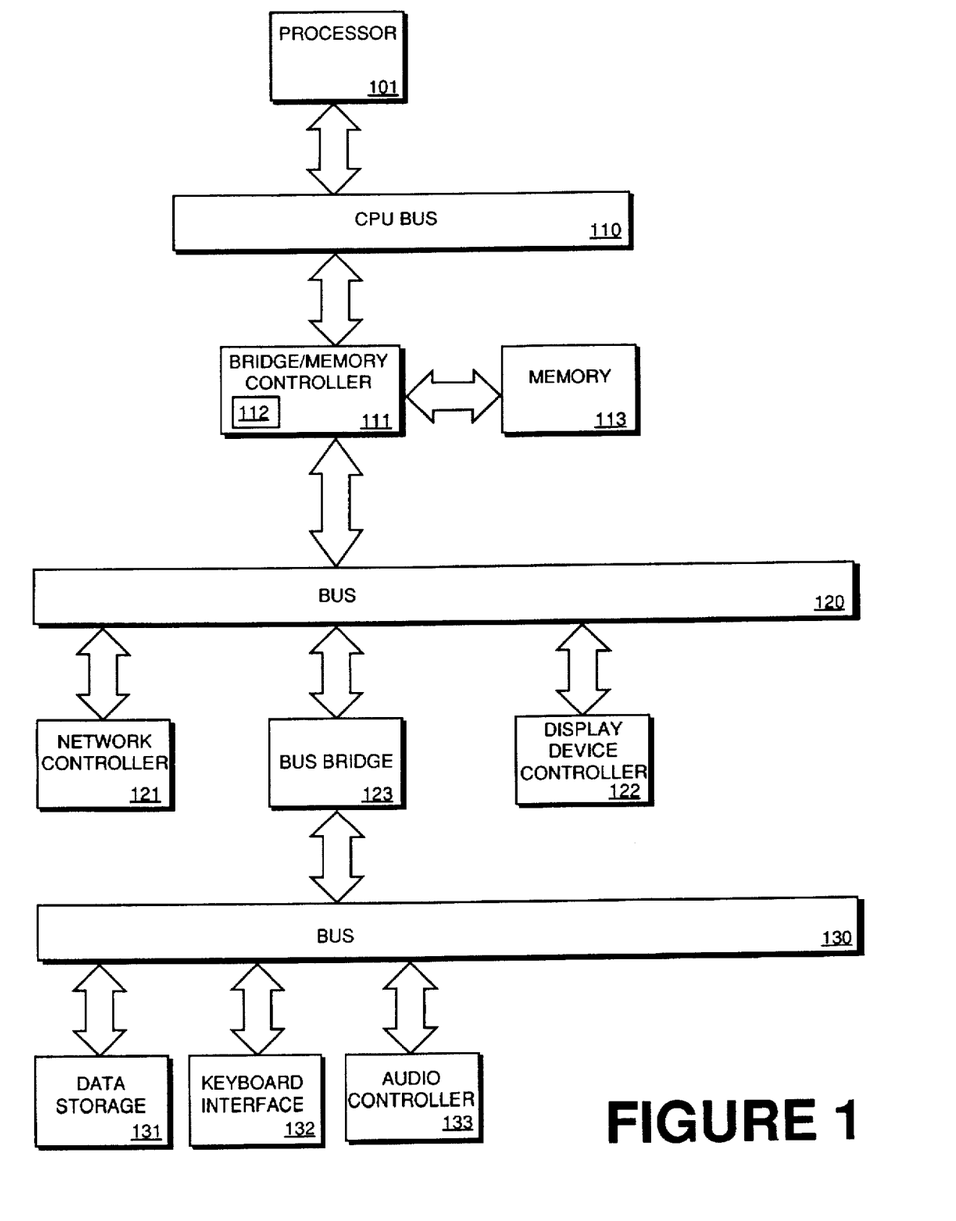
FIG. 1 illustrates an embodiment of the present invention as implemented in a computer system.

FIG. 1 illustrates in block diagram form a computer system of one embodiment of the present invention. The computer system comprises processor 101 for processing digital data. Processor 101 can be a complex instruction set computing (CISC) microprocessor, a reduced instruction set computing (RISC) microprocessor, a very long instruction word (VLIW) microprocessor or other processor device. FIG. 1 shows one example of a single processor computer system which uses the present invention. However, it is understood that the present invention can also be implemented in a computer system having multiple processors. Processor 101 is coupled to CPU bus 110 which transmits signals between processor 101 and other components in the computer system. Memory 113 is coupled to CPU bus 110 and comprises a dynamic random access memory (DRAM) device, a static random access memory (SRAM) device, or other memory devices. Memory 113 stores information or other intermediate data during execution by processor 101. Bridge memory controller 111 is coupled to CPU bus 110 and memory 113. Bridge memory controller 111 directs data traffic between processor 101, memory 113, and other components in the computer system and bridges signal from these components to high speed I/O bus 120.

I/O bus 120 supports peripherals operating at high data throughput rates. Bus 120 can be a single bus or a combination of multiple buses. As an example, bus 120 can comprise a Peripheral Components Interconnect (PCI) bus, a Personal Computer Memory Card International Association (PCMCIA) bus, a VL bus or other buses. Bus 120 provides communication links between components in the computer system. Network controller 121 links a network of computers together and provides communication among the machines. Display device controller 122 is coupled to high speed I/O bus 120. Display device controller 122 allows coupling of a display device to the computer system and acts as an interface between the display device and the computer system. Display device controller 122 can be a monochrome display adapter (MDA) card, a color graphics adapter (CGA) card, enhanced graphics adapter (EGA) card, multi-color graphics array (MCGA) card, video graphics array (VGA) card, extended graphics array (XGA) card or other display device controller. The display device can be a television set, a computer monitor, a flat panel display or other display device. The display device receives information and data from processor 101 through display device controller 122 and displays the information and data to the user of the computer system.

I/O bus 130 is used for communicating information between peripheral device which operate at lower throughput rates. I/O bus 130 can be a single bus or a combination of multiple buses. As an example, bus 130 can comprise an Industry Standard Architecture (ISA) bus, an Extended Industry Standard Architecture (EISA) bus or a Micro Channel Architecture (MCA) bus. Bus 130 provides communication links between components in the computer system. Keyboard interface 132 can be a keyboard controller or other keyboard interface. Keyboard interface 132 can be a dedicated device or can reside in another device such as a bus controller or other controller. Keyboard interface 132 allows coupling of a keyboard to the computer system and transmits signals from a keyboard to the computer system. Mass storage device 131 can be a hard disk drive, a floppy disk drive, a CD-ROM device, a flash memory device or other mass storage device. Audio controller 133 operates to coordinate the recording and playing of sounds is also coupled to I/O bus 130. Bus bridge 123 couples bus 120 to bus 130. Bus bridge 123 comprises a translator to bridge signals between bus 120 and 130.

In one embodiment of the present invention, bridge memory controller 111 comprises a transaction deferral unit 112. Transaction deferral unit 112 operates to defer a current transaction which is taking more than a predetermined amount of time to complete when a pending transaction is waiting to be issued. Transaction deferral unit 112 also operates to indicate to the processor 101 that the current transaction has been deferred by the performance of a split transaction. Deferring or splitting transactions increases the effective bus bandwidth of the CPU bus 110 when multiple parties wish to communicate on the CPU bus 110 at the same time. In one embodiment of the present invention, multiple parties may be multiple processors wishing to communicate on the CPU bus 110. When a transaction is deferred, the transaction is broken down into a request transaction that contains an address, control information, and data in the cases of writes and a response transaction which contains a message to the processor which signals completion of the transaction. The response message may be either that the transaction is completed, if the transaction is successful, or to retry the transaction, if the transaction is unsuccessful. The response transaction is typically generated by the target in order to complete the originally deferred CPU bus transaction. In cases of reads, the response transaction also contains the data requested. Each of the transactions are tagged in order for the processor 101 to identify the transactions. After the request transaction, the CPU bus 110 is released. This frees up the CPU bus 110 during the period of time the request transaction is propagated to the I/O device and allows another requester to use the CPU bus 110. Typically, the data bus lines on the CPU bus 110 is held by the processor during an I/O access even when no actual data transfer is taking place. In split transactions, the data bus lines on the CPU bus 110 are accessed again only after the request transaction is completed for reads.

Split transactions increase the time of completing one transfer or transaction. The CPU bus 110 must be acquired twice, once for the request transaction and once for the response transaction. Split transaction protocols are required to keep track of the other party in a communication. The bridge memory controller 111 must contact the requester to initiate the response portion of the bus transaction, so the identity of the requester must be transmitted and retained by the memory system. Transaction deferral unit 112 dynamically initiates split transactions only when the split transaction can improve the effective CPU bus 110 bandwidth for the entire computer system. Transaction deferral unit 112 strikes a system performance balance between CPU intensive and I/O intensive performance and benchmarks.

Figure 2:
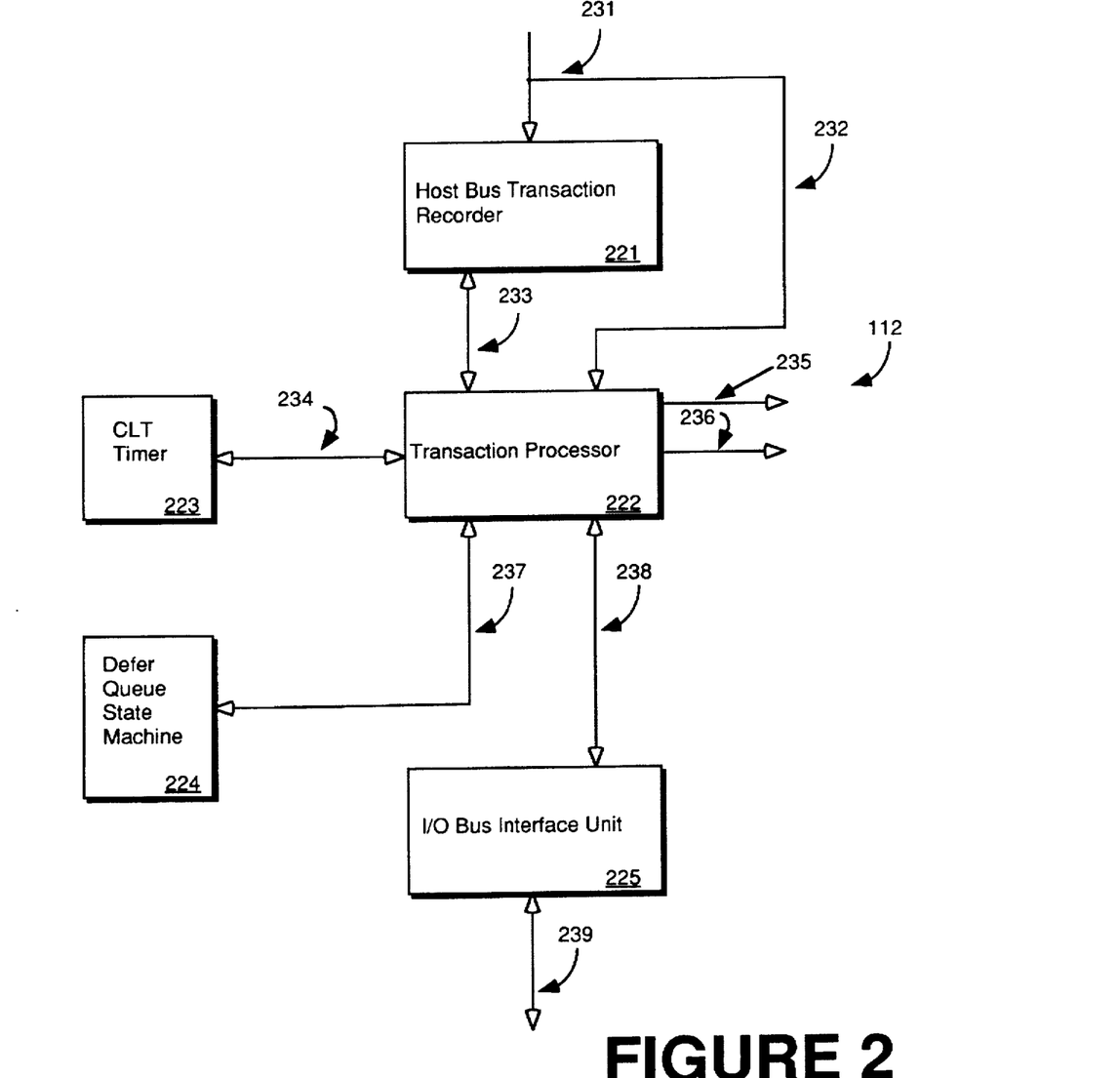
FIG. 2 illustrates a block diagram of one embodiment of a transaction deferral unit according to the present invention.

FIG. 2 illustrates one embodiment of the transaction deferral unit 112 of the present invention. Transaction deferral unit 112 comprises host bus transaction recorder 221, transaction processor 222, CPU latency timer 223, defer queue state machine 224, and I/O bus interface unit 225. Host bus transaction recorder unit 221 operates to record transactions currently issued on the CPU bus 110. Line 231 couples host bus transaction recorder with CPU bus 110. In one embodiment of the present invention, host bus transaction recorder 221 receives request group signals such as address signals, byte enable signals, and cache coherency signals from the CPU bus 110. Host bus transaction recorder 221 monitors the queue on the CPU bus 110 and records information from transactions being issued on the CPU bus 110 according to the time which requests were made. Host bus transaction recorder 221 processes the request group signals from the CPU bus 110 and outputs a dispatch control signal to transaction processor 222.

Transaction processor 222 is coupled to host bus transaction recorder 221. Transaction processor 222 receives dispatch control signals from host bus transaction recorder 221 through line 233. Transaction processor 222 identifies the type of transaction currently issued on the CPU bus 110 by reading the dispatch control signals from a transaction queue in the host bus transaction recorder 221. Transaction processor also receives signals directly from CPU bus 110 through line 232. Transaction processor 222 determines whether there is a pending CPU bus transaction waiting to be issued by processing the signals received from the CPU bus 110. Transaction processor 222 operates to defer the current transaction when there is a pending CPU bus transaction waiting to be issued and when the current CPU bus transaction is a candidate for deferral. Transaction processor 222 may be programmed to operate as a filter to determine which transactions are candidates for deferral and which transactions are not to be deferred. In one embodiment of the present invention, processor I/O transactions are identified by a state machine in transaction processor 222 as possible candidates for deferral. In another embodiment of the present invention, processor I/O cycles, processor interrupt acknowledge cycles, and processor to fast I/O bus special cycles, and processor to fast I/O bus memory reads and writes cycles when posting is disabled are identified by a state machine in transaction processor 205 as possible candidates for deferral. Typically, transactions which hold the data bus lines for a long period of time are good candidates for deferral. Memory access transactions have a fixed latency and generally take a short period of time to complete. Thus, memory access transactions are not good candidates for split transactions and are not deferred.

CPU latency timer 223 is coupled to transaction processor 222. When a pending CPU bus transaction is waiting to be processed on the data bus of the CPU bus 110 and the current transaction is a candidate for deferral, transaction processor sends a signal through line 234 to start CPU latency timer 223. CPU latency timer 223 operates to define the amount of time given to the current transaction to complete before it is deferred in the presence of another pending transaction. CPU latency timer 223 can record the waiting time of several pending CPU bus transactions simultaneously. After the waiting time of a pending CPU bus transaction exceeds a predetermined set time, CPU latency timer 223 outputs a signal through line 234 to transaction processor 222 indicating that the timer has expired.

I/O bus interface unit 225 is coupled to transaction processor 222 through line 238 and to I/O bus 120 though line 239. I/O bus interface unit 225 receives requests from peripherals on I/O bus 120 for accessing CPU bus 110 through line 239.

Transaction processor 222 receives information regarding whether a pending CPU bus transaction exists from data from CPU bus 110, whether the waiting time of a pending CPU bus transaction has exceeded a predetermined set time from CPU latency timer 223, whether the current CPU bus transaction is a candidate for a deferred transaction from host bus transaction recorder 221, and whether a transaction on the I/O bus is targeting memory 113 from I/O bus interface 225. Based on the information received, transaction processor 222 determines whether to dynamically defer a current transaction issued on the CPU bus 110 by issuing a split transaction. Transaction processor 222 outputs a signal to processor 101 through line 235 indicating that the current transaction will be deferred.

Defer queue state machine 224 is coupled to transaction processor 222 through line 237. Defer queue state machine 224 receives a record of the transactions currently issued on the CPU bus 110 and on the I/O bus 120 from the transaction processor and operates to qualify which new transactions may be issued. For transactions that cannot be issued, defer queue state machine 224 sends a signal instructing that the transaction be retried. In one embodiment of the present invention, defer queue state machine 224 operates to issue a retry instruction whenever a I/O access transaction is requested and another I/O access transaction is currently issued.

Figure 3:
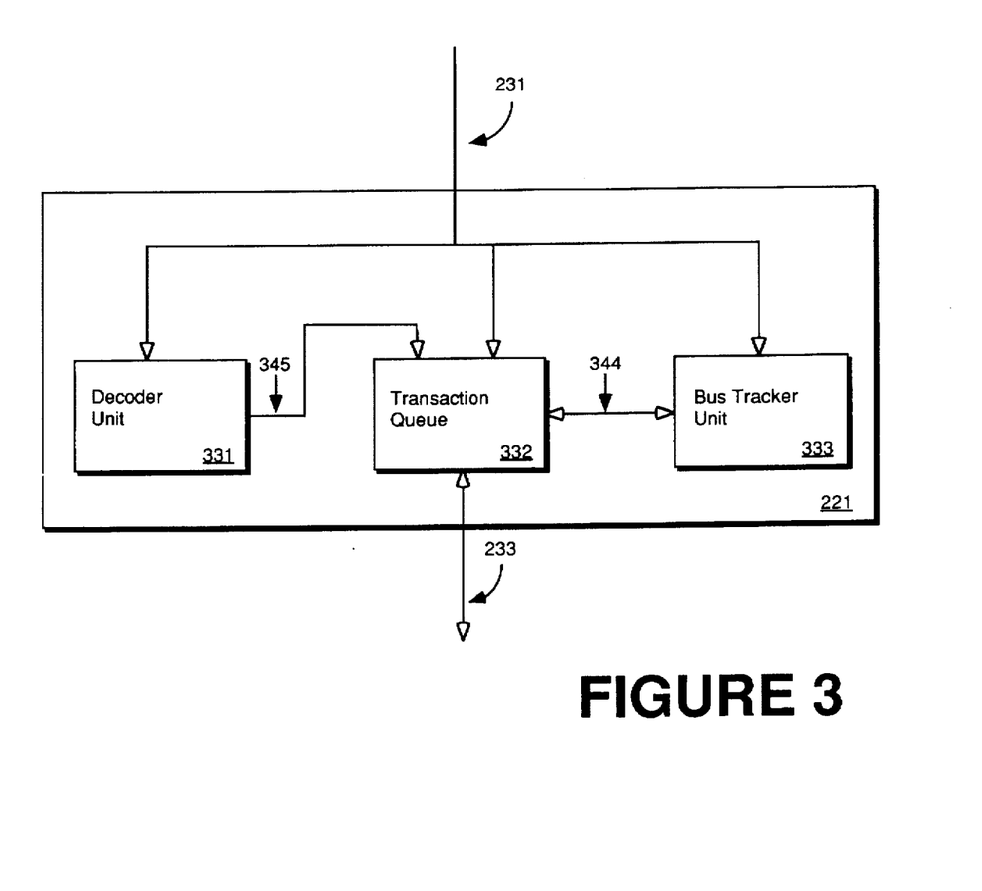
FIG. 3 illustrates one embodiment of a host bus transaction recorder according to the present invention.

FIG. 3 illustrates a block diagram of one embodiment of host bus transaction recorder 221 according to the present invention. Host bus transaction recorder comprises decoder unit 331, transaction queue 332, and bus tracker unit 333. Bus tracker unit 333 receives signals from the CPU bus 110 through line 231 which indicate that a transaction has been issued on the CPU bus 110. Bus tracker unit 333 generates a control signal which it sends to transaction queue 332 instructing transaction queue 332 to latch information such as address signals, byte enable signals, and cache coherency signals from the CPU bus 110 through line 231. The control signal is sent through line 344. Decoder unit 331 operates to decode encoded information regarding destination of access from the CPU bus 110. Decoder unit 331 sends this information to transaction queue 322 through line 345. Transaction queue 332 is a storage unit which stores information processed from decoder unit 331 and information retrieved from CPU bus 110 from each transaction. Transaction queue 332 can be a storage unit which stores information from a single transaction or a storage unit with multiple storage elements such as a FIFO which stores information from multiple transactions. Transaction queue 332 sends information regarding each transaction to transaction processor 222 through dispatch bus 233 as dispatched control signals. Host bus transaction recorder 221 may also be implemented by other known logic circuits.

Figure 4:
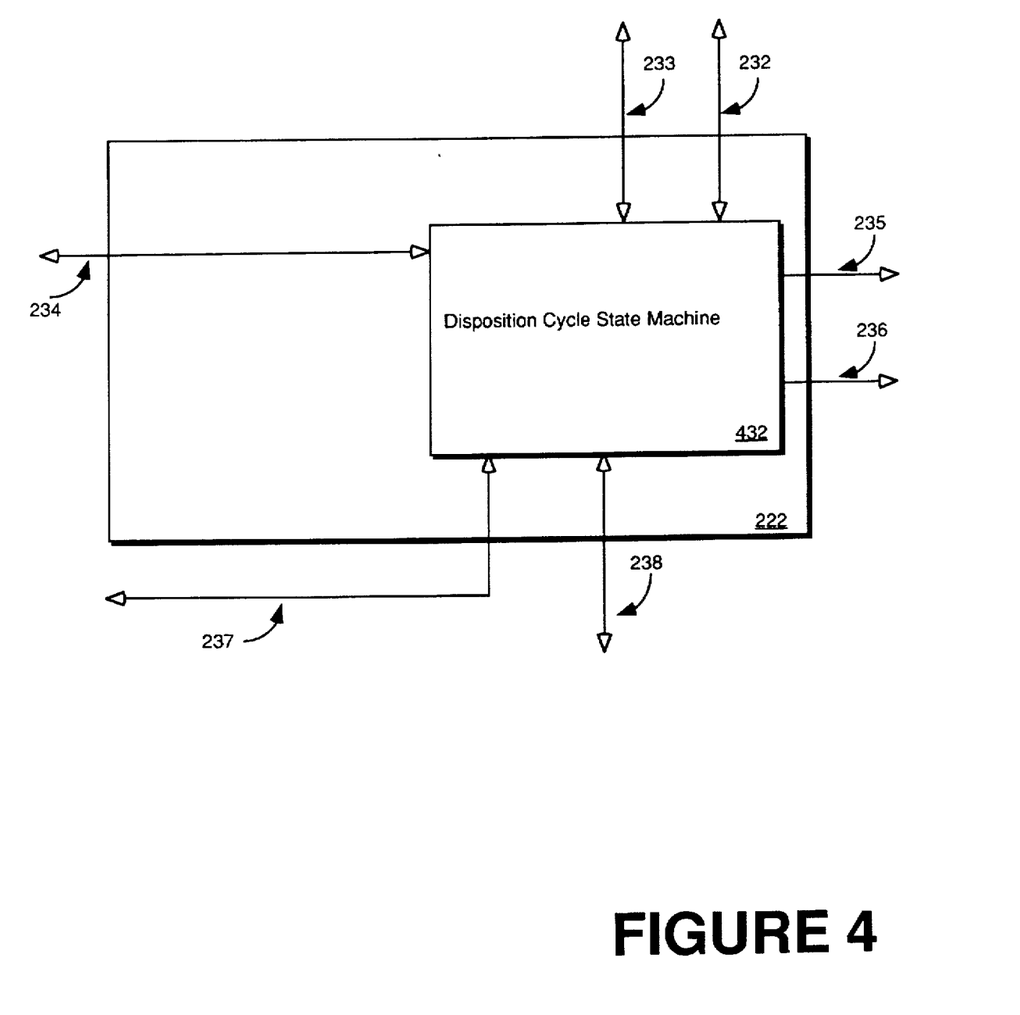
FIG. 4 illustrates one embodiment of a transaction processor according to the present invention.

FIG. 4 illustrates a block diagram of one embodiment of transaction processor 222 according to the present invention. Transaction processor 222 comprises disposition cycle state machine 432. Disposition cycle state machine 432 receives information regarding whether a pending CPU bus transaction exists from data from CPU bus 110 from line 232, whether the waiting time of a pending CPU bus transaction has exceeded a predetermined set time from CPU latency timer 223 from line 234, whether the current CPU bus transaction is a candidate for a deferred transaction from host bus transaction recorder 221 from dispatch bus 233, whether a transaction on the I/O bus is targeting memory 113 from I/O bus interface unit 225 from line 238, and whether or not the pending transaction should be retried from defer queue state machine 224 from line 237. Based on the information received, disposition cycle state machine 432 determines whether to dynamically defer a current transaction issued on the CPU bus 110 by issuing a split transaction. Disposition cycle state machine 432 outputs a signal to processor 101 through line 235 indicating that the current transaction will be deferred. Disposition cycle state machine 432 outputs microcommands to a data path and a DRAM controller through line 236.

In one embodiment of the present invention, disposition cycle state machine 432 issues a split transaction only when the current transaction is an I/O access transaction. I/O access transactions typically take a long period of time to complete. When a transaction is split or deferred, the processor 101 is allowed to use the data bus lines to perform other transactions such as access memory 113. In another embodiment of the present invention, disposition cycle state machine 432 issues a split transaction when the current transaction is a processor I/O cycles, processor interrupt acknowledge cycles, and processor to fast I/O bus special cycles, and processor to fast I/O bus memory reads and writes cycles when posting is disabled. In another embodiment of the present invention, disposition cycle state machine 432 issues a split transaction only when the current transaction is a candidate for deferral and a pending CPU bus transaction is at the CPU bus queue. Additional overhead is incurred whenever a transaction is deferred because the target is required to generate a deferred reply transaction in order to complete the originally deferred CPU bus transaction. Typically, the penalty is 6 host clocks. If CPU bus transactions were deferred based solely on the destination of the transaction regardless of whether there is a pending CPU bus transaction at the CPU bus, the I/O performance of the system would be severely degraded in situations where a penalty is taken unnecessarily. Disposition cycle state machine 432 issues a split transaction only when the computer system conditions warrant it. The decision is made based on monitoring the traffic on the CPU bus 110 through line 232.

In another embodiment of the present invention, disposition cycle state machine 432 issues a split transaction only when the current transaction is a candidate for deferral and a pending CPU bus transaction has been waiting at the CPU bus queue for over a predetermined period of time. In this embodiment of the present invention, disposition cycle state machine 432 issues a split transaction only when CPU latency timer 223 records a waiting time of a pending CPU bus transaction which is greater than a predetermined set time which causes the CPU latency timer to expire. The predetermined set time may be a programmable value or a hard coded value. The CPU latency timer allocates a given amount of time for a transaction to complete before sending an expiration signal to state engine 202. By increasing the time-out period, I/O cycles will be deferred less frequently which will result in lowering the overall CPU to I/O access latency. By decreasing the time-out period, CPU bus latency will be reduced. A programmable CPU latency timer allows one to utilize transaction deferral unit 112 effectively in the chosen computer system environment. For examples, desk top computer systems access to I/O devices are more important whereas for processor based servers a short latency on the CPU bus is more important. Thus, the CPU latency timer 223 should be programmed to give more time for completing an I/O cycle for a desk top computer system. On a computer system server, there are typically several agents which access memory more frequently than I/O devices. Thus, in server environments, the CPU latency timer should be programmed to give less time for completing an I/O cycle.

In another embodiment of the present invention, disposition cycle state machine 432 issues a split transaction when a current CPU bus transaction has been issued and thereafter a I/O bus transaction targets memory 113. Transaction processor 222 may also be implemented by other known logic circuits.

Figure 5:
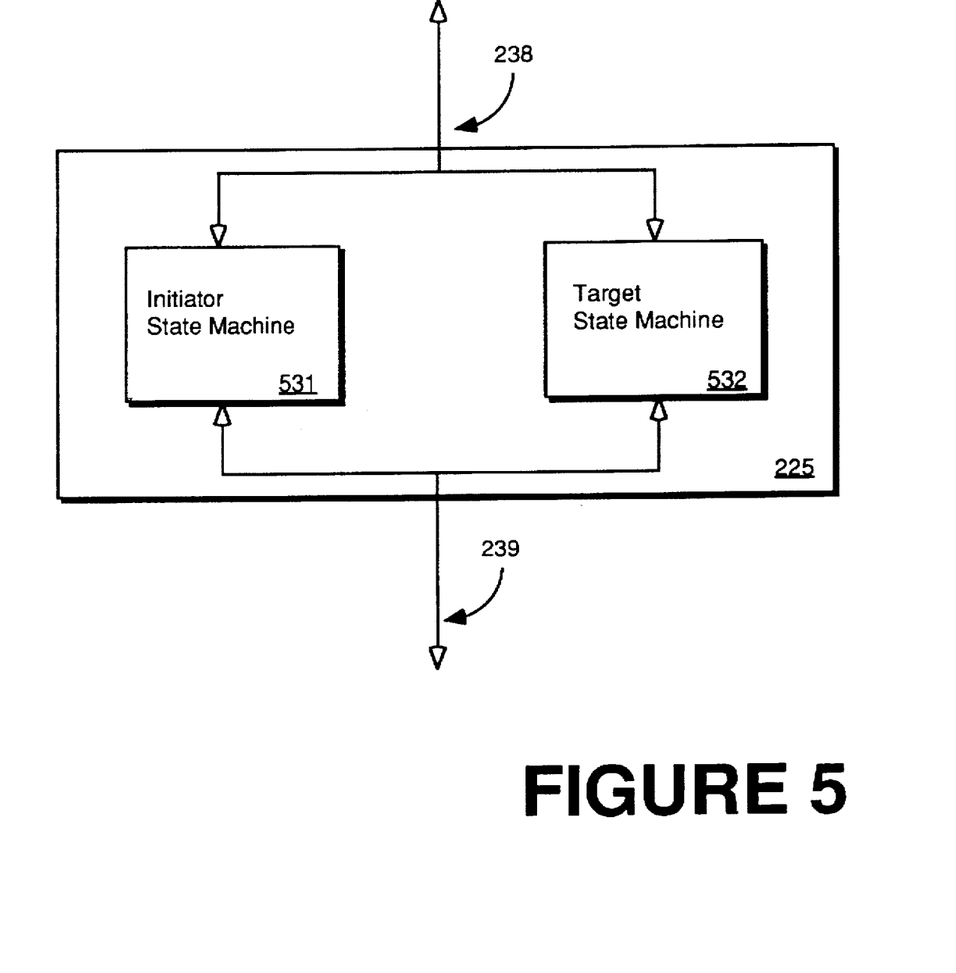
FIG. 5 illustrates one embodiment of a I/O bus interface according to the present invention.

FIG. 5 illustrates a block diagram of one embodiment of a I/O bus interface unit 225 according to the present invention. I/O bus interface unit 225 comprises initiator state machine 531 and target state machine 532. Initiator state machine 531 receives requests from CPU bus 110 to access I/O bus 120. Initiator state machine 531 operates to obtain access to I/O bus 120 and to send a replies back to the CPU bus 110 when the transactions have been completed. Target state machine 532 receives requests from I/O bus 120 to access CPU bus 110. Target state machine 532 operates to send the requests to transaction processor 222. Initiator state machine 531 and target state machine 532 communicate with transaction processor 222 via microcommands. Initiator state machine 531 also encodes information from CPU bus 110 to be sent to I/O bus 120. Target state machine decodes information from I/O bus 120 to be sent to CPU bus 110. Bus interface unit 225 may also be implemented by other known logic circuits.

Figure 6A:
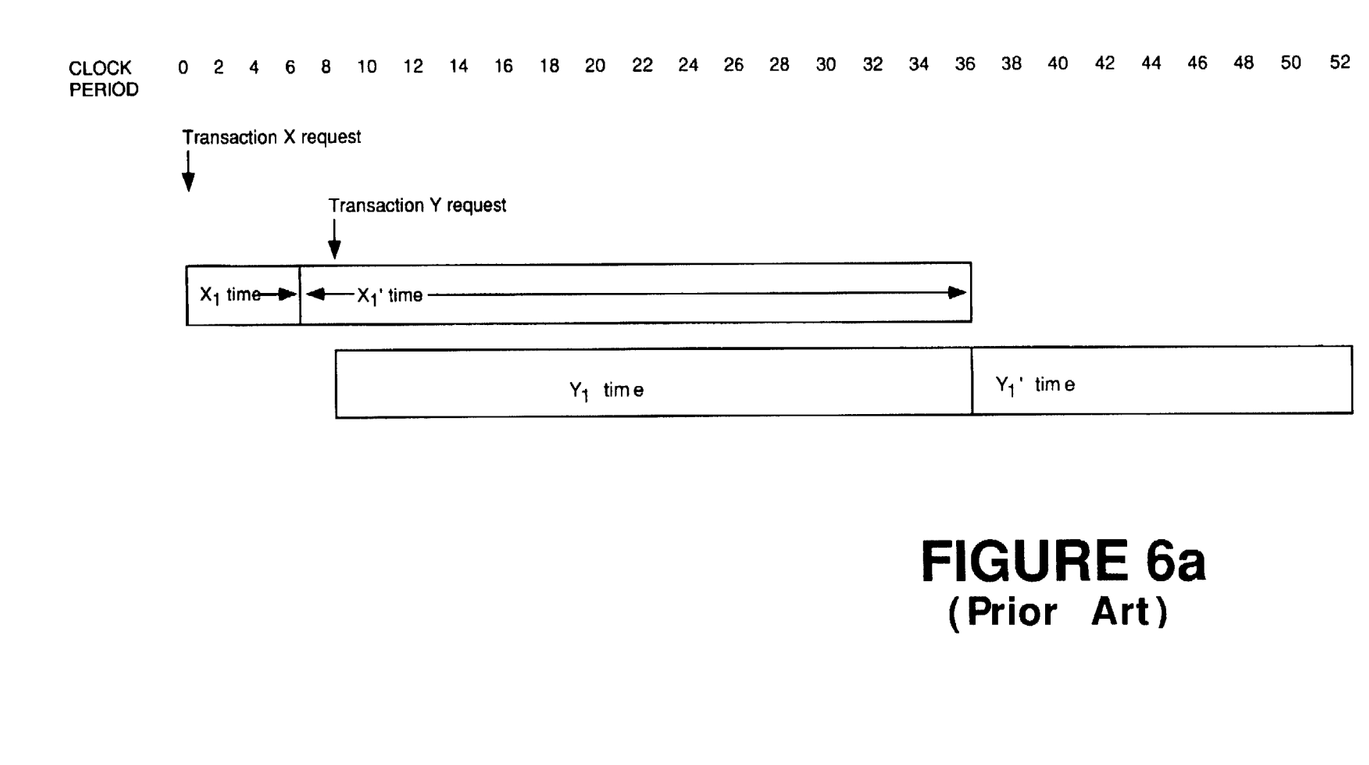
FIG. 6a illustrates how transactions are issued in a conventional computer system.

FIG. 6a illustrates an example of how transactions are issued on a CPU bus in a conventional computer system. In FIG. 6a, transaction X is requested at clock period 0. Transaction X is an external bus transaction which accesses data from an I/O device on an external I/O bus. Since no other transactions are issued on the CPU bus at clock period 0, transaction X completes its request phase and snoop phase during clock periods 0–5. This is indicated by XI time. After the snoop phase, transaction X begins its data phase at clock period 6. During clock periods 6–36, transaction X hold the data bus lines on the CPU bus until the processor receives the data requested. The time period which transaction X holds the data bus lines is shown as $X_1'$ time.

Transaction Y is a memory access transaction requested at clock period 8. At clock period 8, transaction Y accesses the request bus lines and snoop bus lines on the CPU bus and begins its request and snoop phases. Because transaction X holds the data bus lines from clock period 6–35, transaction Y is stalled at its snoop phase and cannot begin its data phase until clock period 36. $Y_1$ time shows the time transaction Y is in request phase and snoop phase. $Y_1'$ shows the time transaction Y is in the data phase. Although memory access transaction can typically be completed in a short period of time, transaction Y takes 44 clock periods to complete when it is executed after a transaction directed to an I/O bus. Additional time is required to complete transaction Y since it is required to wait for transaction X to release the data bus lines on the CPU bus. The wait is required because only one transaction can hold the data bus lines at one time.

Figure 6B:
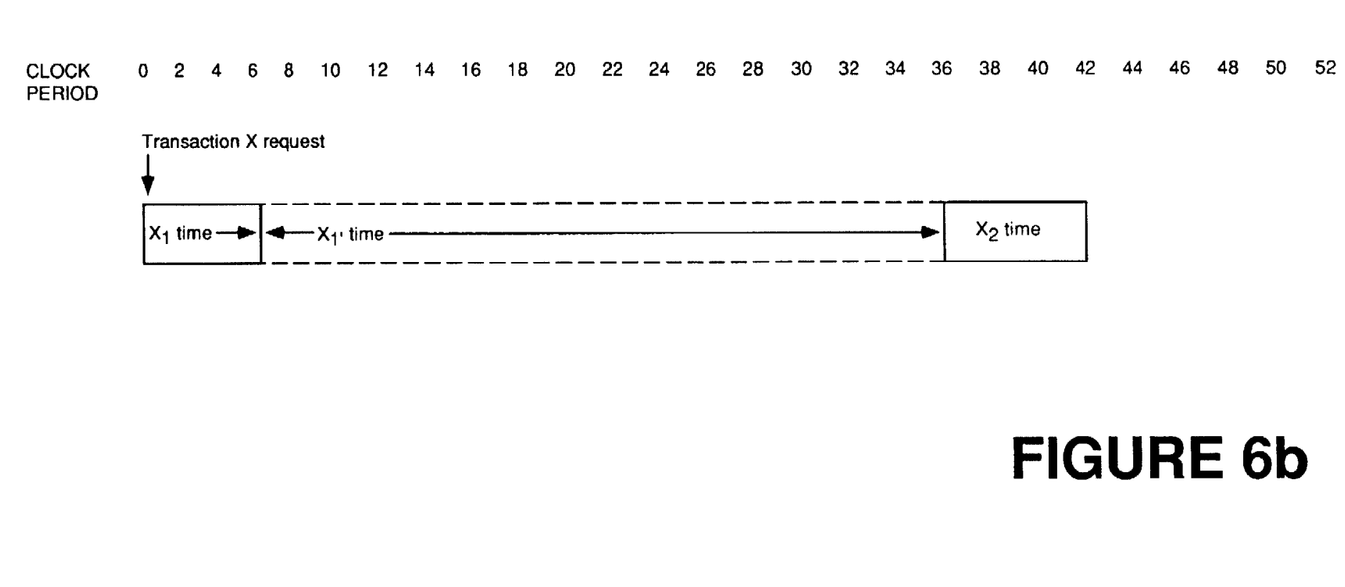
FIG. 6b illustrates the penalty taken on a deferred transaction.

FIG. 6b illustrates an example of how split transactions are issued on a CPU bus and the penalty incurred for splitting the transaction. In FIG. 6b, transaction X is requested at clock period 0. Transaction X is an external bus transaction which accesses data from an I/O device on an external I/O bus. Since no other transactions are issued on the CPU bus at clock period 0, transaction X completes its request phase and snoop phase during clock periods 0–5. This is indicated by $X_1$ time. After the snoop phase, transaction X begins its data phase at clock period 6. After the snoop phase, transaction X begins the data phase by holding the data bus lines. At any time after the data phase begins, transaction X may be deferred. In deferring, the processor is informed that data is not currently available, but will be available at a later time. In response to this, the processor releases the data bus lines on the CPU bus and allows a subsequently requested transaction to be issued on the data lines on the CPU bus. During the time when the data lines are made available for other transactions, the bridge memory controller retrieves the requested data from transaction X independently. The period of time required by the memory controller to retrieve the requested data is illustrated as $X_1'$ time. After the bridge memory controller receives data requested from transaction X, the memory controller issues a response on the CPU bus to send the requested data to the processor. The period of time required on the CPU bus for generating a response is illustrated by $X_2$ time. Computer systems which automatically defer CPU bus transactions solely on the destination of the transaction incur the penalty of $X_2$ time regardless of whether a pending CPU bus transaction needs to use the CPU bus or not. When there is no pending CPU bus transaction waiting to use the CPU bus, it is more efficient to allow the existing CPU bus transaction to be completed without deferring it.

Figure 6C:
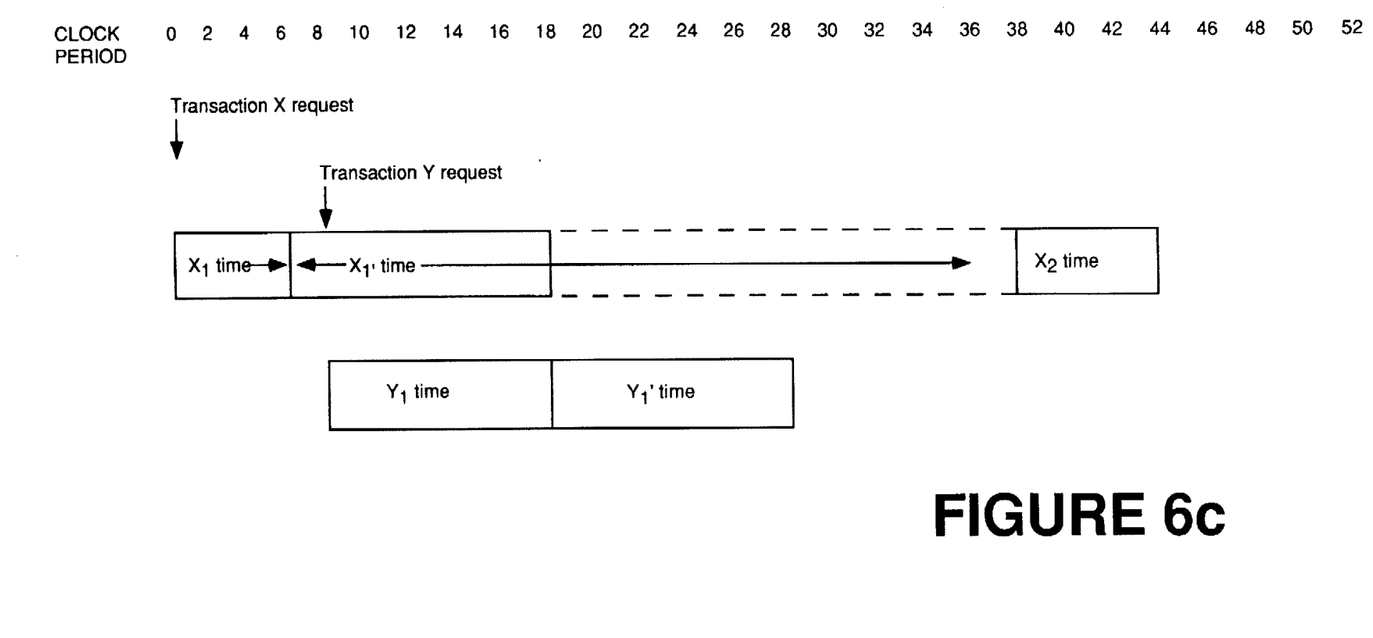
FIG. 6c illustrates how deferred transactions are issued with a transaction deferral unit according to one embodiment of the present invention.

FIG. 6c illustrates an example of how deferred transactions are issued with a transaction deferral unit according to one embodiment of the present invention. In FIG. 6c, transaction X is requested at clock period 0. Transaction X is an external bus transaction which accesses data from an I/O device on an external I/O bus. Since no other transactions are issued on the CPU bus at clock period 0, transaction X completes its request phase and snoop phase during clock periods 0-5. This is indicated by $X_1$ time. After the snoop phase, transaction X begins its data phase at clock period 6. After the snoop phase, transaction X begins the data phase by holding the data bus lines. This is indicated by the solid lines in the $X_1'$ time region.

Transaction Y is memory access transaction requested at clock period 8. Since the request bus lines and snoop bus lines are available, transaction Y begins its request and snoop phases at clock period 8. Although, transaction Y could complete its request and snoop phases by clock period 14, because transaction X is holding the data phase line at clock period 14, transaction Y is stalled at its snoop phase for additional clock periods. The transaction deferral unit of the present invention recognizes that transaction Y is a pending CPU transaction and that transaction X is a I/O access transaction which is a candidate for deferral. After transaction Y has been stalled in its snoop phase for a predetermined amount of time, transaction X is deferred. FIG. 3c shows that at clock period 18, transaction X is deferred. In deferring transaction X, the transaction deferral unit informs the processor that data is not currently available, but will be available at a later time. In response to this, the processor releases the data bus lines on the CPU bus and allows transaction Y to begin its data phase on the CPU bus. During the time when the data bus lines are made available for transaction Y, the bridge memory controller retrieves the requested data from transaction X independently. $Y_1$ shows the time period transaction Y is in the request and snoop phase. $Y_1'$ shows the time period transaction Y is in the data phase. The period of time required by the bridge memory controller to retrieve the requested data is illustrated as $X_1'$ time. After the bridge memory controller receives data requested from transaction X, the bridge memory controller issues a response on the CPU bus to send the requested data to the processor. The period of time required on the CPU bus for generating a response is illustrated by $X_2$ time.

Figure 7:
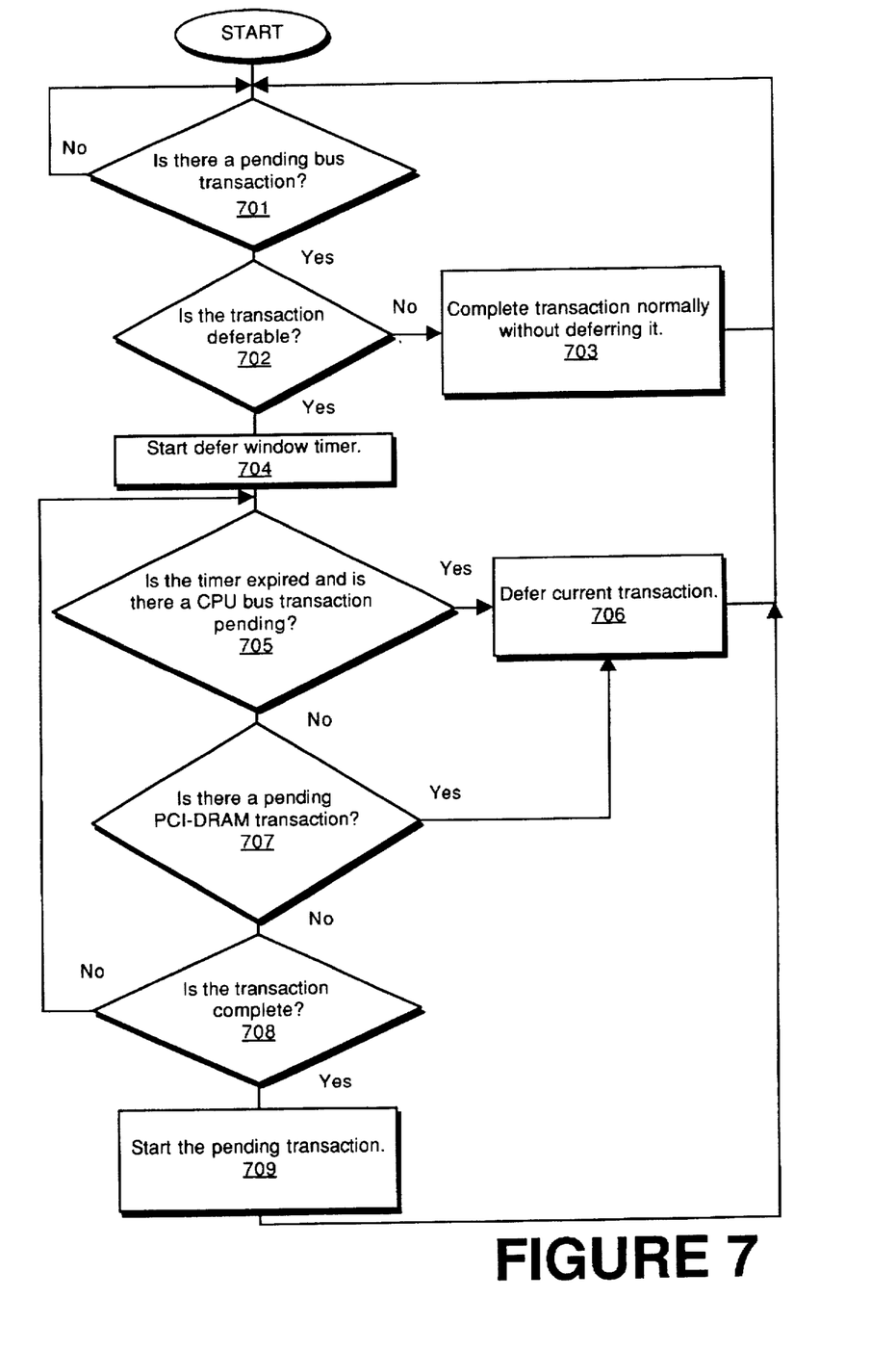
FIG. 7 is a flow chart illustrating a method for dynamically deferring processor to I/O access transactions according to one embodiment of the present invention.

FIG. 7 illustrates a flow chart illustrating a method for dynamically deferring external bus transactions according to one embodiment of the present invention. First, determine whether there is a pending bus transaction. This can be achieved be reading signals from a CPU bus. This is shown in block 701. If no pending bus transaction exists, go back to block 701. If a pending bus transaction exists, determine whether the current requested transaction is a deferrable transaction. This is shown in block 702. The identity of the current bus transaction can be determined by reading recorded information in a transaction recorder. In one embodiment of the present invention, a transaction is deferrable if it is a processor I/O cycle, process interrupt acknowledge cycle, processor to fast I/O bus special cycle, processor to fast I/O bus memory read or write cycle when posting is disabled. If the current bus transaction is not deferrable, complete the current transaction without deferring it as shown in block 703. If the current CPU bus transaction is deferrable, start a CPU latency timer. The CPU latency timer times the amount of time the current bus transaction is taking to complete. This is shown in block 704. Next, determine whether the CPU latency timer has expired as shown in block 705. If the CPU latency timer has expired, defer the current bus transaction as shown in block 706. If the CPU latency timer has not expired, determine whether the pending bus transaction is a fast I/O bus to memory access transaction waiting for the data bus lines. This is shown in block 707. If there is a fast I/O bus to memory access transaction waiting for the data bus lines, defer the current bus transaction as shown in block 706. If the pending bus transaction is not a fast I/O bus to memory access transaction, determine if the current CPU bus transaction is complete as shown in block 708. If the current CPU bus transaction is complete, start the pending transaction as shown in block 709. Next, return to block 701. If the current transaction is not complete, go back to start.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be limiting. Therefore, references to details of particular embodiments are not intended to limit the scope of the claims, which in themselves recite only those features regarded as essential to the invention.

What is claimed is:

1. A transaction deferral mechanism for regulating deferral of a transaction issued on a bus by a processor, comprising:

a bus transaction recorder that includes a decoder unit, coupled to the bus, that receives encoded signals from the bus and that decodes the encoded signals into destination information and that includes a first-in-first-out (FIFO) capable of storing a plurality of destination information from a plurality of pending transactions; and a transaction processor unit, coupled to the bus transaction recorder and the bus, that defers the transaction responsive to a signal that indicates that a pending transaction is waiting to be issued and when the encoded signals indicate that the transaction is a candidate for deferral.

2. The transaction deferral mechanism of claim 1, wherein the transaction processor comprises a pointer that reads a first storage element in the FIFO storing the destination information of the transaction issued on the bus.

3. A transaction deferral mechanism for regulating deferral of a transaction issued on a bus by a processor, comprising:

a bus transaction recorder coupled to the bus that processes encoded signals from the transaction;

a programmable CPU latency timer that times the transaction and outputs an expiration signal when the transaction takes more than a predetermined amount of time to complete; and a transaction processor unit, coupled to the bus transaction recorder, the bus, and the programmable CPU latency timer, that defers the transaction responsive to a signal which indicates that a pending transaction is waiting to be issued, when the encoded signals indicate that the transaction is a candidate for deferral, and when the programmable CPU latency timer outputs the expiration signal.

4. The transaction deferral mechanism of claim 3 further comprising a defer queue state machine that determines whether the pending transaction may be issued on the bus by identifying a transaction type of the transaction and a transaction type of the pending transaction.

5. The transaction deferral mechanism of claim 3, wherein the bus transaction recorder comprises:

a decoder unit coupled to the bus, that receives the encoded signals from the bus and that decodes the encoded signals into destination information readable by the transaction processor; and a transaction queue coupled to the decoder unit that stores the destination information.

6. A transaction deferral mechanism for regulating deferral of a transaction issued on a bus by a processor, comprising:

bus recorder means for processing encoded signals from the transaction issued on the bus;

a programmable timing means for timing the transaction and for outputting an expiration signal when the transaction takes more than a predetermined amount of time to complete; and transaction processor means for deferring the transaction responsive to a signal which indicates that a pending transaction is waiting to be issued, when the encoded signals indicate that the transaction is a candidate for deferral, and when the programmable timing means outputs the expiration signal.

7. A computer system, comprising:

a bus;

a processor coupled to the bus;

a display device controller coupled to the bus;

external memory coupled to the bus; and a transaction deferral mechanism that regulates deferral of a transaction issued on the bus by the processor including a bus transaction recorder coupled to the bus that processes encoded signals from the transaction, a programmable CPU latency timer that times the transaction and outputs an expiration signal when the transaction takes more than a predetermined amount of time to complete, and a transaction processor unit, coupled to the bus transaction recorder, the bus, and the programmable CPU latency timer, that defers the transaction responsive to a signal which indicates that a pending transaction is waiting to be issued, when the encoded signals indicate that the transaction is a candidate for deferral, and when the programmable CPU latency timer outputs the expiration signal.

8. A computer system, comprising:

a bus providing links between components in the computer system;

a processor coupled to the bus; and a transaction deferral mechanism that regulates deferral of a transaction issued on the bus by the processor including a bus transaction recorder coupled to the bus that processes encoded signals from the transaction, a programmable CPU latency timer that times the transaction and outputs an expiration signal when the transaction takes more than a predetermined amount of time to complete, and a transaction processor unit, coupled to the bus transaction recorder, the bus, and the programmable CPU latency timer, that defers the transaction responsive to a signal which indicates that a pending transaction is waiting to be issued, when the encoded signals indicate that the transaction is a candidate for deferral, and when the programmable CPU latency timer outputs the expiration signal.

9. A computer system, comprising:

a bus providing links between components in the computer system;

a processor coupled to the bus; and a transaction deferral mechanism that regulates deferral of a transaction issued on the bus by the processor including a bus transaction recorder that includes a decoder unit, coupled to the bus, that receives encoded signals from the bus and that decodes the encoded signals into destination information and that includes a first-in-first-out (FIFO) capable of storing a plurality of destination information from a plurality of pending transactions, and a transaction processor unit, coupled to the bus transaction recorder and the bus, that defers the transaction responsive to a signal that indicates that a pending transaction is waiting to be issued and when the encoded signals indicate that the transaction is a candidate for deferral.

10. The transaction deferral mechanism of claim 1, wherein the transaction processor unit comprises a state machine programmed to recognize that an I/O access transaction is the candidate for deferral.

* * * * *